Oct. 11, 1960 G. R. BROUSSARD 2,956,230
METHOD FOR LOCATING P-N JUNCTIONS IN SEMICONDUCTOR BODIES
Filed Aug. 29, 1958
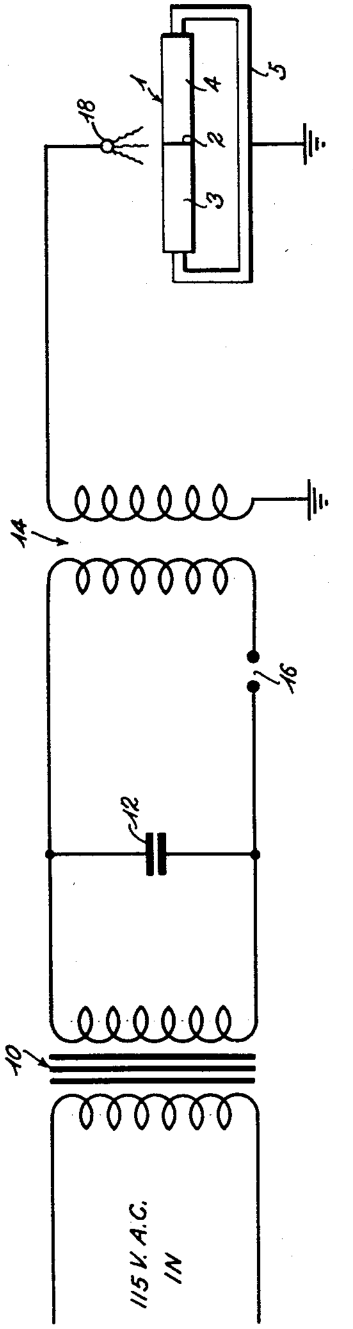
INVENTOR
Gerald R. Broussard
BY Stevens, Davis, Miller & Miller
ATTORNEYS 2,956,230

METHOD FOR LOCATING P-N JUNCTIONS IN SEMICONDUCTOR BODIES

Gerald R. Broussard, Richardson, Tex., assignor to Texas Instruments Incorporated, Dallas, Tex., a corporation of Delaware Filed Aug. 29, 1958, Ser. No. 758,102

5 Claims. (Cl. 324—158)

The present invention relates to a method of testing semi-conductive devices and more particularly to a method for determining the location of junctions and abrupt impurity concentration gradients in semi-conductive bodies.

It is an object of the present invention to provide a rapid and easily practiced method for producing a clearly visible and sharply defined indication of the junctions and abrupt impurity concentration gradients in semi-conductive bodies.

It is another object of the present invention to provide a method for rendering the junctions and abrupt concentration gradients in a semi-conductivity body visible as a dark line.

In accordance with the present invention, regions of different conductivity characteristics of a semi-conductive body are externally connected together, electrically, and a high frequency spark discharge is played over the area of the junction. This discharge in conjunction with the external interconnection of the regions of different conductivity renders the junction visible with respect to the remainder of the semi-conductive body. The method is applicable to all areas of abrupt concentration gradients in semi-conductive bodies and therefore may render visible the interface between N and P conductivity types N and N+ conductivity types, P and P+ conductivity types, N and intrinsic conductivity types. Therefore, the method may be employed in locating conductivity gradients in diodes and transistors and in the latter case may be employed to locate junctions in all of the various types of transistors including those having hook electrodes and intrinsic regions.

It is, therefore, another object of the present invention to provide a simple and rapid method for defining the junctions in semi-conductive bodies and the other regions of abrupt concentration gradients by rendering them visible and in particular to render these regions visible by externally grounding the different conductivity regions and playing an electrical discharge across the region of the junction or gradient.

The above and still further objects, features and advantages of the present invention will become apparent upon consideration of the following detailed description of one specific embodiment thereof, especially when taken in conjunction with the accompanying drawings, wherein:

The single figure of the accompanying drawing illustrates the apparatus employed in practicing the method of the present invention.

Referring now specifically to the single figure of the accompanying drawing, there is illustrated a body of semi-conductive material 1 having formed therein a junction 2 subsisting between a region 3 of N-conductivity type and a region 4 of P-conductivity type. It is not intended to limit the applicability of the invention to determining only the junction between N- and P-conductivity types of semi-conductive material, since the method is applicable, as indicated above, not only to the determination of specific junctions between materials of opposite conductivity types, but also to the determination of any abrupt impurity concentration gradient.

The bar of semi-conductive material is clamped between the jaws of a C-clamp 5 electrically connected to a source of reference potential, which for the purpose of illustration is electrical ground. A tesla coil provides an electric spark discharge to be played across the surface of the body 1. The coil consist of an iron core transformer 10 the primary of which is adapted to be connected to a suitable source of power such as a 115 volt A.C. source. A condenser 12 and the primary of an air core high frequency transformer 14 are connected in parallel across the secondary of transformer 10. A spark gap 16 is connected in series with the primary of transformer 14. The secondary of transformer 14 is grounded on one side and terminates in a probe 18 on the other side. In accordance with the well known operation of a tesla coil, the probe 18 is a point of high frequency potential. If positioned close enough to the surface of the body 1, a high frequency arcing will take place. The spark discharge thus produced can be played across the surface of body 1 and will, in accordance with the invention, render junctions and abrupt concentration gradients visible.

The method of the invention may be applied to the determination of the junctions and concentration gradients subsisting in semi-conductive bodies regardless of the method of formation of the junction; that is, regardless of whether the junction is formed by diffusion, alloying, crystal pulling, etc. Further, the method is applicable to determination of the junctions or concentration gradients in germanium, and silicon as well as in other materials employed in semi-conductive devices, such as the intermetallic compounds.

The method of the invention produces very rapid results requiring only a few seconds to effect the desired treatment to render the region 2 visible. The frequency employed for energizing the spark device is referred to as a high frequency discharge, the high frequency being desirable only in that it promotes discharge at relatively lower currents than might otherwise be possible. However, the high frequency aspect of the invention is not considered to be a limiting factor since at higher input currents the treatment may be effected at relatively lower frequencies.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. The method of locating the junction between regions of a body of semi-conductive material of different conductivity characteristics comprising providing an external electric connection between the regions of the body and subjecting the area of the junction to an electric arc discharge.

2. The method of locating the junction between regions, of a body of semi-conductive material, of different conductivity characteristics comprising providing an external electric connection between the regions of the body and subjecting the area of the junction to a high frequency electric arc discharge.

3. The method of locating the junction between regions of a body of semi-conductive material of different conductivity characteristics comprising electrically connecting the regions of the body to a common point of reference potential and subjecting the area of the junction to an electric arc discharge.

4. The method of locating the junction between regions of a body of semi-conductive material of different conductivity characteristics comprising electrically connecting the regions of the body to a common point of reference potential and subjecting the area of the junction to a high frequency electric arc discharge.

5. The method of locating a junction between regions of a body of semi-conductive material comprising positioning a point of high frequency potential spaced from the surface of said body to cause a high frequency arc to form and moving said point relative to the surface of said body.

References Cited in the file of this patent

UNITED STATES PATENTS

| | | |
|---|---|---|
| 2,669,692 | Pearson | Feb. 16, 1954 |
| 2,748,349 | Dickten et al. | May 29, 1956 |
| 2,790,952 | Pietenpol | Apr. 30, 1957 |
| 2,802,160 | Engeler | Aug. 6, 1957 |